(12) United States Patent
Kishita et al.

(10) Patent No.: US 10,583,711 B2
(45) Date of Patent: Mar. 10, 2020

(54) VEHICULAR TEMPERATURE REGULATION DEVICE

(71) Applicant: DENSO CORPORATION, Kariya, Aichi-pref. (JP)

(72) Inventors: Hiroshi Kishita, Kariya (JP); Keigo Satou, Kariya (JP); Yasumitsu Omi, Kariya (JP); Kouji Takahashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 31 days.

(21) Appl. No.: 15/763,852

(22) PCT Filed: Sep. 5, 2016

(86) PCT No.: PCT/JP2016/075927
§ 371 (c)(1),
(2) Date: Mar. 28, 2018

(87) PCT Pub. No.: WO2017/056856
PCT Pub. Date: Apr. 6, 2017

(65) Prior Publication Data
US 2019/0047360 A1    Feb. 14, 2019

(30) Foreign Application Priority Data

Sep. 30, 2015   (JP) ................................. 2015-192755

(51) Int. Cl.
*B60H 1/00* (2006.01)
*B60H 1/32* (2006.01)
(Continued)

(52) U.S. Cl.
CPC ..... *B60H 1/00885* (2013.01); *B60H 1/00328* (2013.01); *B60H 1/00335* (2013.01);
(Continued)

(58) Field of Classification Search
CPC ........ F25B 25/005; B60H 2001/00928; B60H 1/32284; B60H 1/00899; B60H 1/00885; B60H 1/22
See application file for complete search history.

(56) References Cited

U.S. PATENT DOCUMENTS

2015/0128632 A1\* 5/2015 Kishita .............. B60H 1/00271
62/324.6
2017/0326945 A1\* 11/2017 Hatakeyama ...... B60H 1/00385

FOREIGN PATENT DOCUMENTS

WO    WO-2011015426 A1    2/2011
WO    WO-2012172751 A1 \* 12/2012    ......... B60H 1/00271

\* cited by examiner

*Primary Examiner* — Eric S Ruppert
(74) *Attorney, Agent, or Firm* — Harness, Dickey & Pierce, P.L.C.

(57) ABSTRACT

A vehicular temperature regulation device includes a refrigeration cycle, a high-temperature cycle, and a low-temperature cycle. The refrigeration cycle includes a heating heat exchanger configured to heat the heat medium in the high-temperature cycle by exchanging heat between the refrigerant and the heat medium, and a cooling heat exchanger configured to cool the heat medium in the low-temperature cycle by exchanging heat between the refrigerant and the heat medium. The vehicular temperature regulation device includes a connection portion that connects the high-temperature cycle and the low-temperature cycle, a regulation portion configured to regulate a flow of the heat medium, and a controller. After the controller stops the compressor, or after the controller receives a stop command of stopping the compressor, the controller controls the regulation portion, a first pump, and a second pump to exchange the heat medium between the high-temperature cycle and the low-temperature cycle.

4 Claims, 4 Drawing Sheets

(51) Int. Cl.
*F25B 25/00* (2006.01)
*F25B 49/02* (2006.01)
*B60H 1/14* (2006.01)

(52) U.S. Cl.
CPC ............. *B60H 1/143* (2013.01); *B60H 1/323* (2013.01); *B60H 1/3216* (2013.01); *B60H 1/3225* (2013.01); *B60H 1/32284* (2019.05); *F25B 25/005* (2013.01); *F25B 49/022* (2013.01); *B60H 2001/3272* (2013.01); *F25B 2339/047* (2013.01); *F25B 2600/0251* (2013.01); *F25B 2600/13* (2013.01)

VEHICULAR TEMPERATURE REGULATION DEVICE

CROSS REFERENCE TO RELATED APPLICATIONS

This application is a U.S. National Phase Application under 35 U.S.C. 371 of International Application No. PCT/JP2016/075927 filed on Sep. 5, 2016 and published in Japanese as WO 2017/056856 A1 on Apr. 6, 2017. This application is based on and claims the benefit of priority from Japanese Patent Application No. 2015-192755 filed on Sep. 30, 2015. The entire disclosures of all of the above applications are incorporated herein by reference.

TECHNICAL FIELD

The present disclosure relates to a vehicular temperature regulation device that regulates a temperature of components mounted on a vehicle.

BACKGROUND ART

A conventional vehicular air conditioning device conditions air in a vehicle compartment by using a refrigerant heated or cooled in a refrigeration cycle device. Specifically, a high-temperature refrigerant is heated by heat exchange with a cycle refrigerant in a condenser constituting the refrigeration cycle device, and a low-temperature refrigerant is cooled by heat exchange with the cycle refrigerant in a chiller constituting the refrigeration cycle device. According to this, the high-temperature refrigerant is used for heating air, and the low-temperature refrigerant is used for cooling air.

In Patent Document 1, a temperature regulation device is disclosed, in which temperatures of a battery, an internal combustion engine, an electric motor, an inverter and the like are controlled independently. In the temperature regulation device of Patent Document 1, a refrigeration cycle provides cool water and hot water, and the distribution of the cool water and the hot water is controlled to regulate a temperature of a target object.

PRIOR ART DOCUMENT

Patent Document

Patent Document 1: WO 2011/015426 A1

SUMMARY OF THE INVENTION

In the above-described vehicular air conditioning device and the temperature regulation device disclosed in Patent Document 1, after the refrigeration cycle is stopped, i.e. after the compressor is turned off, the low-temperature refrigerant which has been cooled remains around the chiller, and the high-temperature refrigerant remains around the water cooling condenser. According to this, the cycle refrigerant is warmed around the water cooling condenser. The cycle refrigerant is cooled around the chiller. Accordingly, in the refrigeration cycle, a large amount of a liquid refrigerant remains around the chiller. If the compressor is actuated after the liquid refrigerant remains around the chiller, a large amount of the liquid refrigerant is drawn into the compressor, and then liquid compression in which the liquid refrigerant is compressed in the compressor may occur. When the liquid compression occurs, the compressor tries to compress the liquid refrigerant that is difficult to be compressed compared to a gas refrigerant, and then a large load is exerted on the compressor and the compressor may be wrecked. Additionally, if the liquid refrigerant overflows out of the compressor, so-called a liquid washing may occur, in which a lubricant oil flows out of the compressor along with the liquid refrigerant. According to this, the lubricant oil in the compressor may become insufficient, and then the compressor may be wrecked.

In consideration of the above-described points, it is an objective of the present disclosure to provide a vehicular temperature regulation device capable of limiting a liquid refrigerant from being drawn to a compressor.

A vehicular temperature regulation device according to an aspect of the present disclosure includes a refrigeration cycle in which a refrigerant circulates, a high-temperature cycle in which a heat medium circulates, and a low-temperature cycle in which the heat medium circulates. The refrigeration cycle includes: a compressor configured to draw and discharge the refrigerant; a heating heat exchanger configured to heat the heat medium in the high-temperature cycle by exchanging heat between the refrigerant discharged from the compressor and the heat medium circulating in the high-temperature cycle; a decompressor configured to decompress and expand the refrigerant which has exchanged heat in the heating heat exchanger; and a cooling heat exchanger configured to cool the heat medium in the low-temperature cycle by exchanging heat between the refrigerant which has been decompressed and expanded by the decompressor and the heat medium circulating in the low-temperature cycle. The high-temperature cycle includes a first pump configured to circulate the heat medium, and a heating portion configured to heat a heating target by using the heat medium heated in the heating heat exchanger. The low-temperature cycle includes a second pump configured to circulate the heat medium, and a cooling portion configured to cool a cooling target by using the heat medium cooled by the cooling heat exchanger. The vehicular temperature regulation device includes: a connection portion that connects the high-temperature cycle and the low-temperature cycle; a regulation portion that is provided in the connection portion and configured to regulate a flow of the heat medium between the high-temperature cycle and the low-temperature cycle; and a controller configured to control the first pump and the second pump. After the controller stops the compressor, or after the controller receives a stop command of stopping the compressor, the controller controls the regulation portion, the first pump, and the second pump such that at least a part of the heat medium is exchanged between the high-temperature cycle and the low-temperature cycle.

According to this aspect, the connection portion that connects the high-temperature cycle and the low-temperature cycle is provided. In the connection portion, the regulation portion that regulates the flow of the heat medium between the high-temperature cycle and the low-temperature cycle is provided. The heat medium can be exchanged between the high-temperature cycle and the low temperature cycle by controlling the regulation portion. After the controller stops the compressor, or the controller receives the stop command of stopping the compressor, the controller controls the regulation portion to exchange at least a part of the heat medium is exchanged between the high-temperature cycle and the low-temperature cycle. According to this, the high-temperature heat medium in the high-temperature cycle can be sent to the low-temperature cycle. Accordingly, a temperature of the heat medium in the low-temperature cycle can be increased. Since a temperature of the refrigerant in the cooling heat exchanger is also increased, the refrigerant can be limited from becoming a liquid refrigerant. Accordingly, when the compressor is restarted, the amount of the liquid refrigerant can be decreased. Since the amount of the gas refrigerant drawn into the compressor can be increased while the liquid refrigerant is decreased, the amount of the liquid refrigerant compressed by the compressor is decreased. Consequently, the performance of the compressor can be stabilized, and then the durability of the compressor can be elongated.

EMBODIMENTS FOR EXPLOITATION OF THE INVENTION

Figure 1:
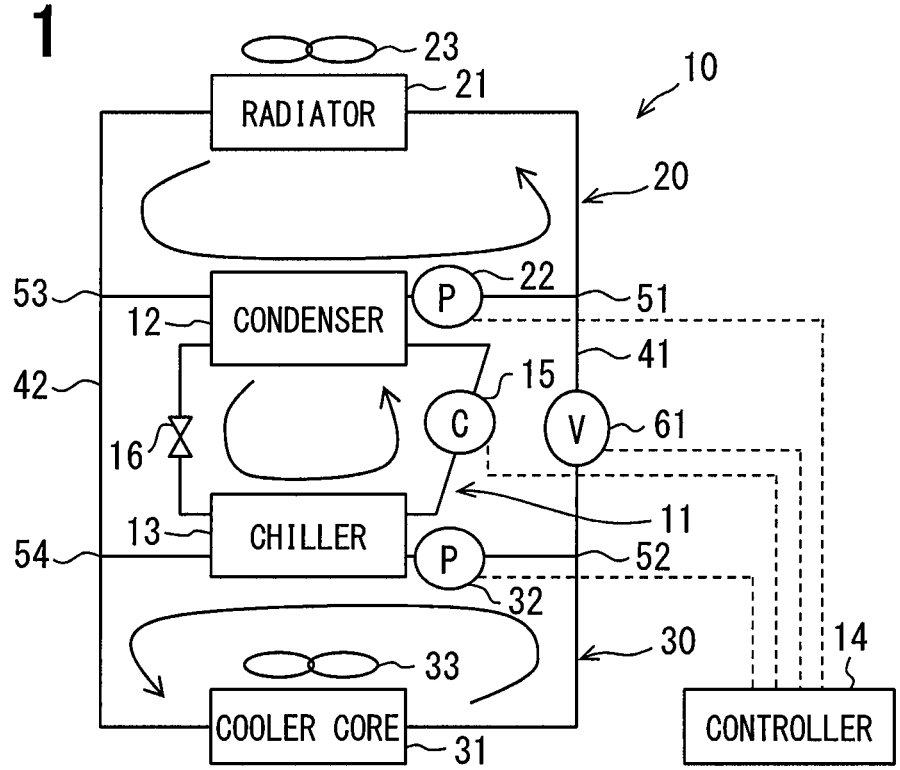
FIG. 1 is a diagram illustrating a vehicular temperature regulation device according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 to 3. A vehicular temperature regulation device 10 is constituted by a secondary loop system in which a refrigeration cycle 11 includes a water cooling condenser 12 and a chiller 13. In the present embodiment, the vehicular temperature regulation device 10 is used for cooling and heating a vehicle compartment. The vehicular temperature regulation device 10 includes the refrigeration circuit 11, a high-temperature cycle 20, a low-temperature cycle 30, and a controller 14. A refrigerant circulates in the refrigeration circuit 11. A coolant circulates in the high-temperature cycle 20 and the low-temperature cycle 30.

In the refrigeration circuit 11, the refrigerant circulates, and the refrigerant is compressed or decompressed. Accordingly, the refrigerant absorbs heat from the coolant circulating in the low-temperature cycle 30 and dissipates the heat to the coolant circulating in the high-temperature cycle 20. The refrigeration circuit 11 is a vapor compression type, for example. The refrigeration circuit 11 includes a compressor 15, the condenser 12, a decompressor 16, and the chiller 13, as shown in FIG. 1.

The compressor 15 is an electric compressor 15. The compressor 15 draws and compresses a low-pressure refrigerant flowing out of the chiller 13 to discharge a high-pressure refrigerant to the condenser 12. The condenser 12 is a heating heat exchanger and heats the coolant in the high-temperature cycle 20 by heat of the high-pressure refrigerant. Accordingly, the condenser 12 is a heat exchanger that exchanges heat between the refrigeration circuit 11 and the high-temperature cycle 20. Since the condenser 12 exchanges heat between the coolant and the refrigerant, the condenser 12 may be referred to as a coolant-refrigerant heat exchanger.

The decompressor 16 decompresses to expand the high-pressure refrigerant flowing out of the condenser 12. The chiller 13 evaporates the coolant decompressed by the decompressor 16. The chiller 13 is a cooling heat exchanger and cools the coolant by evaporating the refrigerant. The chiller 13 is a heat exchanger that exchanges heat between the refrigeration circuit 11 and the low-temperature cycle 30. Since the chiller 13 exchanges heat between the coolant and the refrigerant, the chiller 13 may be referred to as a coolant-refrigerant heat exchanger.

The same heat medium circulates in the high-temperature cycle 20 and the low-temperature cycle 30. The heat medium is a coolant containing an antifreeze, in the present embodiment. The high-temperature cycle 20 includes a radiator 21 and a high-temperature pump 22. The high-temperature pump 22 is a first pump and circulates the coolant in the high-temperature cycle 20. The high-temperature pump 22 is capable of switches a direction of the coolant between a first direction and a second direction opposite from the first direction. The high-temperature pump 22 may be a reversing pump that is capable of switching directions of motor rotation to switch directions of sent water. The direction of the coolant sent by the high-temperature pump 22 is controlled such that the refrigerant and the coolant flow in the condenser 12 in opposite directions to each other.

The coolant flowing through the condenser 12 is sent by the high-temperature pump 22 to flow into the radiator 21. When the coolant flows through the condenser 12, the coolant is heated by the high-temperature refrigerant. Accordingly, a high-temperature coolant flows into the radiator 21.

A high-temperature fan 23 that generates a flow of air toward the radiator 21 is provided in a vicinity of the radiator 21. Since a motor of the high-temperature fan 23 is driven to rotate, the air flows through the radiator 21, and accordingly the heat exchange in the radiator 21 is enhanced. According to this, heat of an outside air and the coolant in the radiator 21 is exchanged, and the heat is dissipated to the outside air. Accordingly, the radiator 21 functions as a heating portion heating air that is a heating target by using the coolant heated in the condenser 12.

The low-temperature cycle 30 includes a cooler core 31 and a low-temperature pump 32. The low-temperature pump 32 is a second pump and circulates the coolant in the low-temperature cycle 30. The low-temperature pump 32 is capable of switching a direction of the coolant between a third direction and a fourth direction opposite from the third direction. The low-temperature pump 32 may be a reversing pump that is capable of switching directions of motor rotation to switch directions of sent water. The direction of the coolant sent by the low-temperature pump 32 is controlled such that the refrigerant and the coolant flow in the chiller 13 in opposite directions to each other.

The coolant flowing through the chiller 13 is sent by the low-temperature pump 32 to flow into the cooler core 31. When the coolant flows through the chiller 13, the coolant is cooled by the low-temperature refrigerant. Accordingly, a high-temperature coolant flows into the cooler core 31.

A low-temperature fan 33 that generates a flow of air toward the cooler core 31 is provided in a vicinity of the cooler core 31. Since a motor of the low-temperature fan 33 is driven to rotate, the air flows through the cooler core 31, and accordingly the heat exchange in the cooler core 31 is enhanced. According to this, heat is exchanged between an outside air and the coolant in the cooler core 31, and the heat is absorbed from the outside air. Accordingly, the cooler core 31 functions as a heating portion heating air that is a heating target by the coolant cooled in the chiller 13.

The air heated by the radiator 21 flows through an outside passage through which the air is released into the outside air, or a warm air passage through which the air is sent to the vehicle compartment. Likewise, the air cooled by the cooler core 31 flows through the outside passage or a cool air passage through which the air is sent to the vehicle compartment. The selection of passages is controlled by an opening-closing door.

In the present embodiment, a connection portion that connects the high-temperature cycle 20 and the low-temperature cycle 30 to each other is provided. The connection portion is constituted by two first pipes 41 and a second pipe 42. The first pipe 41 connects a first branch portion 51, which is located between the high-temperature pump 22 and the radiator 21 in the high-temperature cycle 20, to a second branch portion 52, which is located between the low-temperature pump 32 and the cooler core 31 in the low-temperature cycle 30. The second pipe 42 connects a third branch portion 53, which is located between the radiator 21 and the condenser 12 in the high-temperature cycle 20, to a fourth branch portion 54, which is located between the chiller 13 and the cooler core 31 in the low-temperature cycle 30. In the first pipe 41, a first valve 61 that is a regulation portion regulating a flow of the coolant between the high-temperature cycle 20 and the low-temperature cycle 30 is provided. An opening degree of the first valve 61 is controlled from a fully open condition to a fully closed condition. The first valve 61 is controlled by the controller 14.

The vehicular temperature regulation device 10 includes the controller 14. The controller 14 is a microcomputer including a storage media readable by a computer. The storage media stores programs readable by the computer. The storage media may be provided as a memory. The controller 14 controls devices by executing the programs.

The controller 14 controls electrically controllable devices such as the opening-closing door, the compressor 15, the high-temperature pump 22, the low-temperature pump 32, and the first valve 61. The controller 14 controls the devices such that a temperature of the vehicle compartment becomes a target temperature in accordance with temperature information in the vehicular temperature regulation device 10 such as the temperature of the vehicle compartment and a temperature of the outside air. When the temperature of the vehicle compartment is higher than the target temperature, the controller 14 controls the devices to perform a cooling operation. In the cooling operation, the vehicle compartment is cooled. When the temperature of the vehicle compartment is lower than the target temperature, the controller 14 controls the devices to perform a heating operation. In the heating operation, the vehicle compartment is heated.

In the cooling operation, the controller 14 actuates the compressor 15, the high-temperature pump 22 and the low-temperature pump 32. An open-close condition of the opening-closing door is controlled such that the air flowing through the cooler core 31 flows into the vehicle compartment through the cooling passage. The opening-closing door is controlled such that the air flowing through the radiator 21 is released through the outside passage.

In the low-temperature cycle 30, the coolant cooled by the chiller 13 flows into the cooler core 31, and the coolant exchanges heat with the outside air to cool the outside air. The cool air is sent to the vehicle compartment. In contrast, the coolant heated by the condenser 12 flows into the radiator 21, and the outside air is heated by exchanging heat with the coolant and released to outside.

In the heating operation, the controller 14 actuates the compressor 15, the high-temperature pump 22, and the low-temperature pump 32. The open-close condition of the opening-closing door is controlled such that the air flowing through the radiator 21 flows into the vehicle compartment through the cooling passage. The opening-closing door is controlled such that the air flowing through the cooler core 31 is released through the outside passage.

In the low-temperature cycle 30, the coolant cooled by the chiller 13 flows into the cooler core 31, and the coolant exchanges heat with the outside air to cool the outside air. The cool air is released to the outside. In contrast, the coolant heated by the condenser 12 flows into the radiator 21, and the outside air is heated by exchanging heat with the coolant and sent to the vehicle compartment.

Next, controls after the refrigeration circuit 11 is stopped will be described with reference to FIG. 2. FIG. 2 shows a process that is repeated within a short time when the compressor 15 is actuated. It is assumed that the compressor 15 continues moving until a predetermined time is elapsed after a control for stopping the compressor 15 is performed.

In step S1, it is determined whether stopping of the compressor 15 is instructed. When the stopping is instructed, the process proceeds to step S2. Step S1 is repeated until the stopping is instructed. A condition in which the stopping is instructed means a condition in which an ignition switch of a vehicle is turned off or a condition in which a user operates to stop the air-conditioning, for example.

In step S2, the compressor 15 is controlled to be stopped, and then the process proceeds to step S3. In step S3, the first valve 61 is controlled to be in an open condition, the high-temperature pump 22 is actuated, the low-temperature pump 32 is stopped, and then the process proceeds to step S4. As shown in FIG. 3, the high-temperature pump 22 causes the coolant in the high-temperature cycle 20 flow through the first pipe 41 into the low-temperature cycle 30. The coolant flows through the low-temperature pump 32, the chiller 13 of the low-temperature cycle 30, and the second pipe 42, and then the coolant flows back to the high-temperature cycle 20.

In step S4, it is determined whether a predetermined time has elapsed, and step S4 is repeated until the predetermined time elapses. When the predetermined elapsed, the process proceeds to step S5. The controller 14 performs a control such that an exchange of the coolant in the low-temperature cycle 30 and the coolant in the high-temperature cycle 20 continues for the predetermined time.

In step S5, i.e. after the predetermined time has elapsed, the first valve 61 is controlled to be in a close condition, the high-temperature pump 22 is stopped, and then the process is ended. According to this, each of the low-temperature cycle 30 and the high-temperature cycle 20 works as an independent cycle, as shown in FIG. 1.

As described above, components are controlled in step S3 and step S4 such that the coolant in the high-temperature cycle 20 flows into the low-temperature cycle 30 and the coolant in the low-temperature cycle 30 flows into the high-temperature cycle 20. That is, the high-temperature coolant in the high-temperature cycle 20 and the low-temperature coolant in the low-temperature cycle 30 are exchanged at least partially. Accordingly, the low-temperature refrigerant in the chiller 13 can be heated by the high-temperature coolant flowing from the high-temperature cycle 20.

As described above, in the vehicular temperature regulation device 10 of the present embodiment, the first pipe 41 and the second pipe 42 are provided as connection portions that connects the high-temperature cycle 20 and the low-temperature cycle 30 with each other. The first valve 61 is provided in the first pipe 41 as a regulation portion that regulates the flow of the heat medium between the high-temperature cycle 20 and the low-temperature cycle 30. According to this, the coolant that is the heat medium can be exchanged between the high-temperature cycle 20 and the low-temperature cycle 30 by controlling the first valve 61. After the compressor 15 is stopped, the controller 14 controls the first valve 61 to exchange the coolant in the high-temperature cycle 20 and the coolant in the low-temperature cycle 30 at least partially. According to this, the high-temperature coolant in the high-temperature cycle 20 flows into the low-temperature cycle 30. The temperature of the coolant in the low-temperature cycle 30 can be increased. Accordingly, the temperature of the refrigerant in the chiller 13 that is a cooling heat exchanger is increased, and the refrigerant can be limited from becoming a liquid refrigerant. Therefore, the amount of the liquid refrigerant drawn into the compressor 15 when the compressor 15 is restarted can decrease. Since the amount of the liquid refrigerant decreases and the amount of the gas refrigerant increases when the compressor 15 is driven, the amount of the liquid refrigerant compressed by the compressor 15 decreases. Consequently, the performance of the compressor 15 can be stabilized, and then the durability of the compressor 15 can be elongated.

That is, after the refrigeration circuit 11 is stopped, i.e. the compressor 15 is stopped, the hot coolant and the cool coolant are partially exchanged by means of the first valve 61, the high-temperature pump 22, and the low-temperature pump 32. According to this, the temperature of the condenser 12 decreases, and the temperature of the chiller 13 increases. Accordingly, the amount of the liquid refrigerant remaining in the chiller 13, i.e. a remaining amount that is the amount of the liquid refrigerant remaining in the chiller 13 after the stop of the compressor 15, decreases. Since the large amount of the refrigerant is exchanged to change the temperature, the liquid refrigerant moves to the condenser 12. Consequently, since a compression of the liquid refrigerant and a liquid washing when the compressor 15 is restarted are decreased, troubles can be avoided, and the refrigeration circuit 11 can start quickly.

That is, in the present embodiment, the cooled coolant around the chiller 13 and the coolant warmed by the condenser 12 are exchanged at least partially. According to this, since the liquid refrigerant around the chiller 13 can be decreased, a trouble of the compressor 15 can be limited, and a starting condition of the refrigeration circuit 11 can be improved.

In the present embodiment, the controller 14 performs a control such that the exchange of the coolant continues until a predetermined exchange ending condition is met, i.e. until the predetermined time elapses. The predetermined time may be a time length in which the low-temperature coolant surely moves to the vicinity of the condenser 12, and the high-temperature coolant surely moves to the vicinity of the chiller 13. Since the predetermined time is set, the temperature of the refrigerant in the chiller 13 surely increases. All the coolant may be exchanged between the low-temperature cycle 30 and the high-temperature cycle 20, or half of the coolant may be exchanged between the low-temperature cycle 30 and the high-temperature cycle 20 depending on the predetermined time.

Second Embodiment

Figure 4:
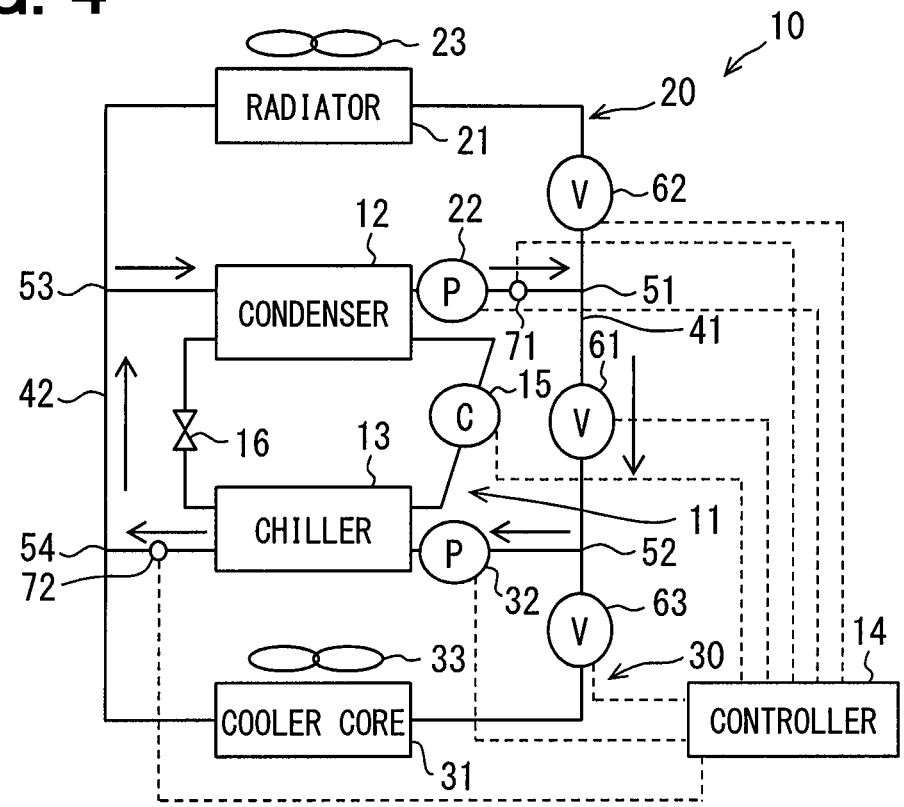
FIG. 4 is a diagram illustrating a vehicular temperature regulation device according to a second embodiment of the present disclosure.

Next, a second embodiment of the present disclosure will be described with reference to FIG. 4. In the present embodiment, a second valve 62 is provided between the first branch portion 51 and the radiator 21, and a third valve 63 is provided between the second branch portion 52 and the cooler core 31, as shown in FIG. 4.

In the cooling operation and the heating operation, the first valve 61 is controlled to be in close condition, and the second valve 62 and the third valve 63 are controlled to be in open condition. According to such controls, a first circulation condition is set, in which the coolant circulates in the high-temperature cycle 20 and the low-temperature cycle 30 independently. After the compressor 15 is stopped, the first valve 61 is controlled to be in open condition, and the second valve 62 and the third valve 63 are controlled to be in close condition. According to such controls, a second circulation condition is set, in which the coolant circulates between the condenser 12 and the chiller 13 without passing through the radiator 21 and the cooler core 31.

A first temperature sensor 71 is provided in the high-temperature cycle 20 as a detector that detects the temperature of the coolant in the high-temperature cycle 20. A second temperature sensor 72 is provided in the low-temperature cycle 30 as a detector that detects the temperature of the coolant in the low-temperature cycle 30. The first temperature sensor 71 is provided between the high-temperature pump 22 and the first branch portion 51. The second temperature sensor 72 is provided between the chiller 13 and the fourth branch portion 54. Each of the first temperature sensor 71 and the second temperature sensor 72 sends a detected temperature information to the controller 14.

Figure 2:
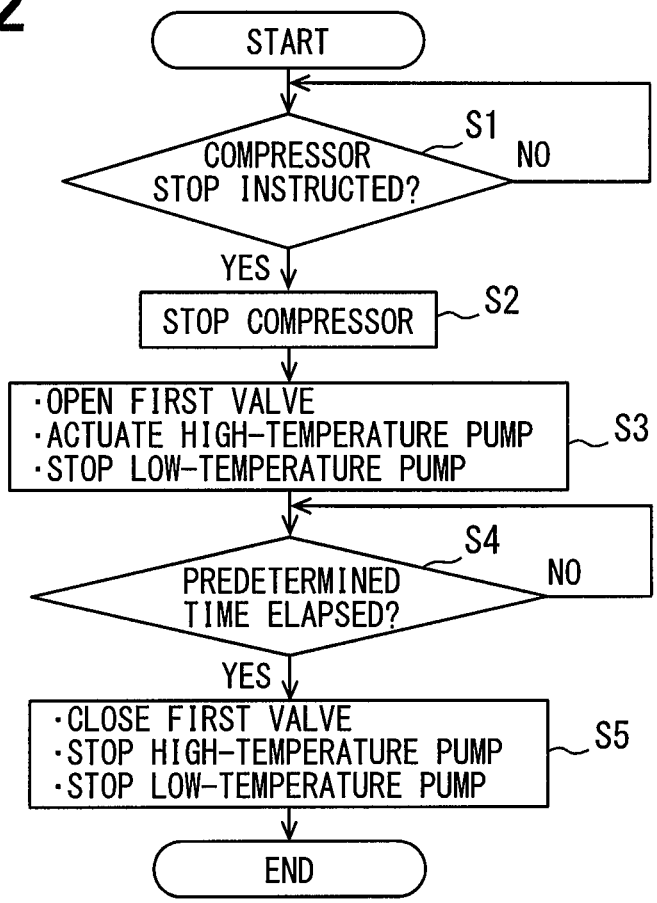
FIG. 2 is a flowchart illustrating a process executed by a controller according to the first embodiment.
Figure 3:
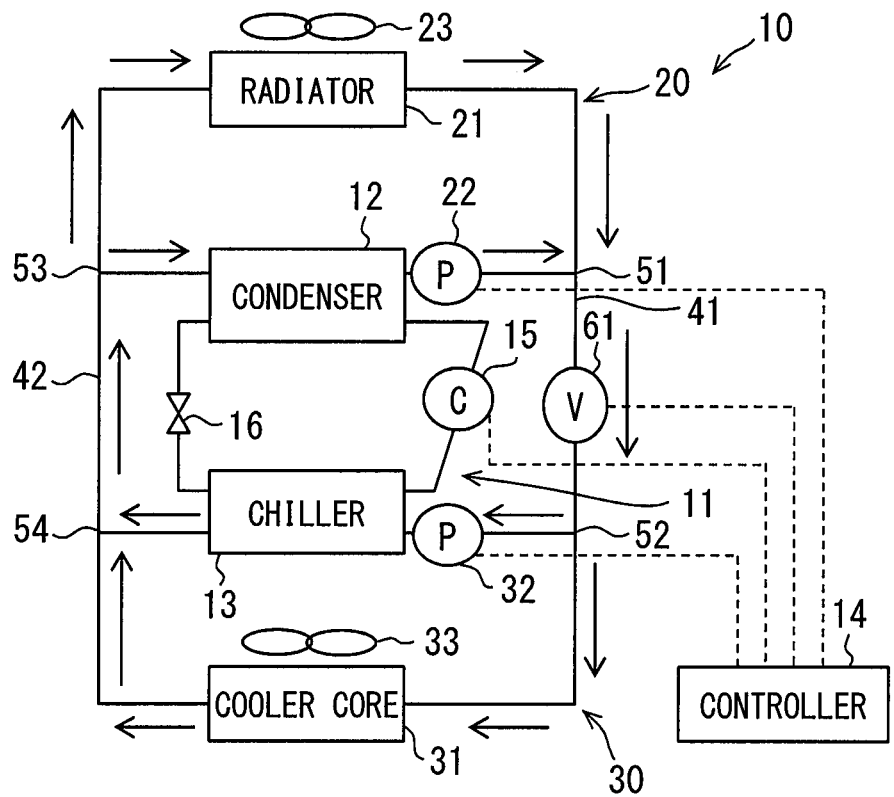
FIG. 3 is a diagram illustrating a flow of a coolant after a compressor is stopped according to the first embodiment.

In the control for exchanging the coolant between the high-temperature cycle 20 and the low-temperature cycle 30, i.e. in step S3 in FIG. 2, the first valve 61 is controlled to be in open condition, and the second valve 62 and the third valve 63 are controlled to be in close condition. Further, the high-temperature pump 22 is actuated, and the low-temperature pump 32 is stopped. In this case, the second circulation condition is set, and the coolant in the high-temperature cycle 20 flows into the chiller 13 of the low-temperature cycle 30 through the first pipe 41 due to the high-temperature pump 22. Subsequently, the coolant passes through the low-temperature pump 32, the chiller 13 of the low-temperature cycle 30, and the second pipe 42 in order, and then the coolant flows into the vicinity of the condenser 12 in the high-temperature cycle 20. Accordingly, the coolant can be exchanged between the chiller 13 and the condenser 12 without flowing through the radiator 21 and the cooler core 31. Therefore, the coolant in the chiller 13 and the condenser 12 can be exchanged in short time.

The controller 14 continues exchanging the coolant until the exchange end condition is met. In the present embodiment, the exchange end condition is met when a difference between the temperature of the coolant in the high-temperature cycle 20 detected by the first temperature sensor 71 and the temperature of the coolant in the low-temperature cycle 30 detected by the second temperature sensor 72 is within a predetermined range. For example, a few degrees Celsius is set as the predetermined range. According to this, the exchange of the coolant continues until the temperature of the coolant in the high-temperature cycle 20 becomes equal to or approximately equal to the temperature of the coolant in the low-temperature cycle 30. Accordingly, the temperature of the refrigerant around the chiller 13 surely increases. Therefore, the same effects as the above-described first embodiment can be obtained. The exchange end condition may be met when the difference between the temperature of the coolant in the high-temperature cycle 20 detected by the first temperature sensor 71 and the temperature of the coolant in the low-temperature cycle 30 detected by the second temperature sensor 72 is at or below a predetermined value. In this case, the predetermined value may be set at or below 10 degrees Celsius.

Third Embodiment

Figure 5:
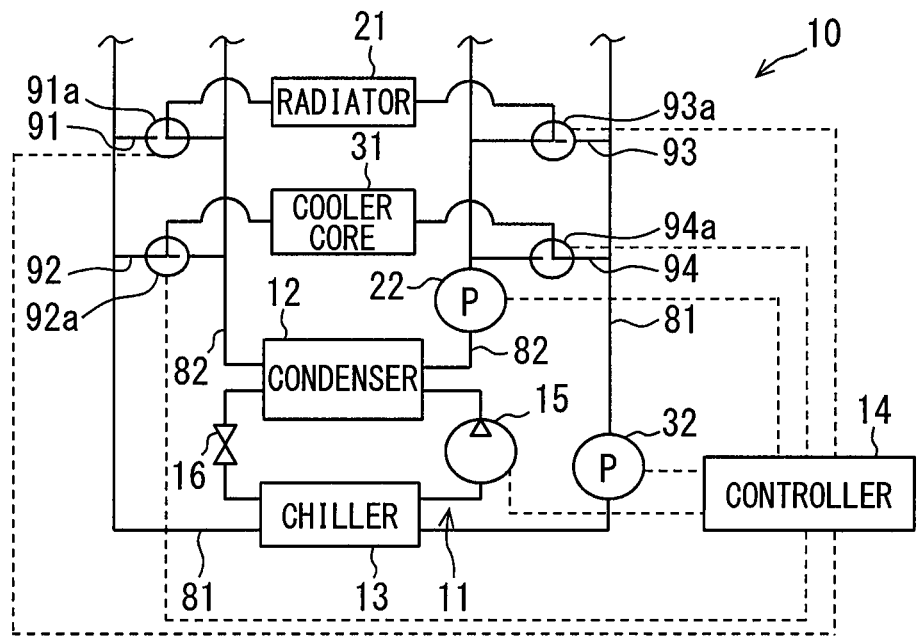
FIG. 5 is a diagram illustrating a vehicular temperature regulation device according to a third embodiment of the present disclosure.

Next, a third embodiment will be described with reference to FIGS. 5 to 7. In the present embodiment, a pathway of the coolant is different from the above-described first embodiment. The pipe connected to a coolant side of the chiller 13 is a low-temperature pipe 81. The pipe connected to a coolant side of the condenser 12 is a high-temperature pipe 82. The low-temperature pump 32 is provided in the low-temperature pipe 81. The high-temperature pump 22 is provided in the high-temperature pipe 82. A part of the low-temperature pipe 81 located downstream of the chiller 13 is connected to a part of the high-temperature pipe 82 located downstream of the condenser 12 at multiple (two in the present embodiment) parts by a first connection pipe 91 and a second connection pipe 92. A part of the low-temperature pipe 81 located upstream of the low-temperature pump 32 is connected to a part of the high-temperature pipe 82 located upstream of the high-temperature pump 22 at multiple (two in the present embodiment) parts by a third connection pipe 93 and a fourth connection pipe 94.

A three-way valve is provided in each of the connection pipes. A first three-way valve 91a of the first connection pipe 91 is connected to a downstream side of the radiator 21. The first three-way valve 91a is capable of switching between a connection condition where the low-temperature pipe 81 is connected to the radiator 21 and a connection condition where the high-temperature pipe 82 is connected to the radiator 21.

A second three-way valve 92a of the second connection pipe 92 is connected to a downstream side of the cooler core 31. The second three-way valve 92a is capable of switching between a connection condition where the low-temperature pipe 81 is connected to the cooler core 31 and a connection condition where the high-temperature pipe 82 is connected to the cooler core 31.

A third three-way valve 93a of the third connection pipe 93 is connected to an upstream side of the radiator 21. The third three-way valve 93a is capable of switching between a connection condition where the low-temperature pipe 81 is connected to the radiator 21 and a connection condition where the high-temperature pipe 82 is connected to the radiator 21.

A fourth three-way valve 94a of the fourth connection pipe 94 is connected to an upstream side of the cooler core 31. The fourth three-way valve 94a is capable of switching between a connection condition where the low-temperature pipe 81 is connected to the cooler core 31 and a connection condition where the high-temperature pipe 82 is connected to the cooler core 31.

Figure 6:
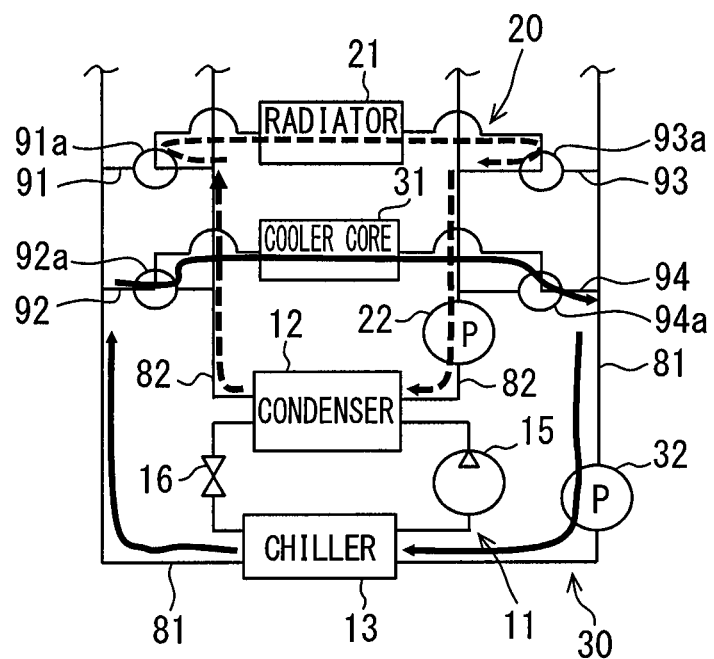
FIG. 6 is a diagram illustrating a flow of a coolant in a first circulating condition according to the third embodiment.
Figure 7:
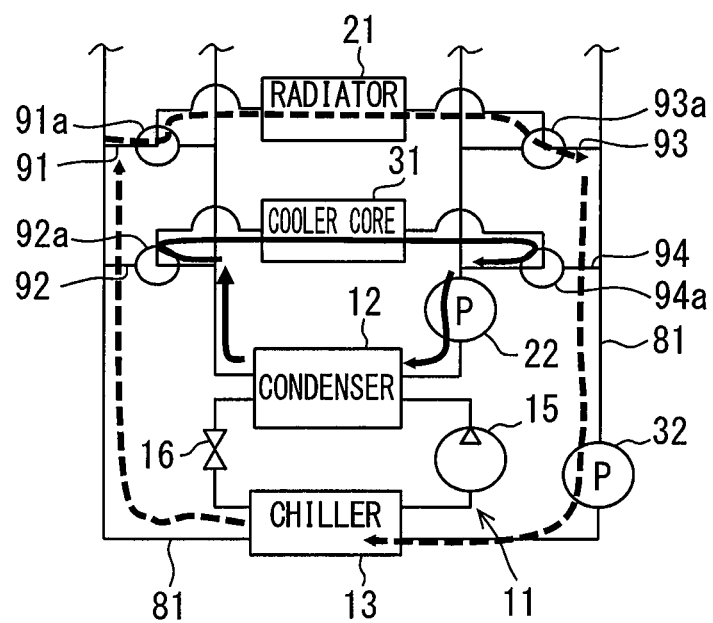
FIG. 7 is a diagram illustrating a flow of a coolant in a second circulating condition according to the third embodiment.

The controller 14 controls the connection condition of each three-way valves to switch between a first circulation condition shown in FIG. 6 and a second circulation condition shown in FIG. 7. In the first circulation condition, the high-temperature cycle 20 and the low-temperature cycle 30 are formed, and the coolant circulates in each cycles. In the second circulation condition, the coolant circulates between the radiator 21 and the chiller 13, and the coolant circulates between the cooler core 31 and the condenser 12.

In the first circulation condition, the first three-way valve 91a and the third three-way valve 93a are controlled to connect the high-temperature pipe 82 and the radiator 21. According to this, when the high-temperature pump 22 is actuated, the coolant circulates between the radiator 21 and the condenser 12. The second three-way valve 92a and the fourth three-way valve 94a are controlled to connect the low-temperature pipe 81 and the cooler core 31. According to this, when the low-temperature pump 32 is actuated, the coolant circulates between the cooler core 31 and the chiller 13. Consequently, the high-temperature cycle 20 and the low-temperature cycle 30 are formed as in the above-described first embodiment. Accordingly, the cooling operation and the heating operation can be performed.

After the compressor 15 is stopped, a control is performed such that the circulation condition is in the second circulation condition shown in FIG. 7. Specifically, the first three-way valve 91a and the third three-way valve 93a are controlled to connect the low-temperature pipe 81 and the radiator 21. According to this, when the low-temperature pump 32 is actuated, the coolant circulates between the radiator 21 and the chiller 13. Consequently, the high-temperature coolant flowing through the radiator 21 flows into the chiller 13, and then the coolant is exchanged between the radiator 21 and the chiller 13.

The second three-way valve 92a and the fourth three-way valve 94a are controlled to connect the high-temperature pipe 82 and the cooler core 31. According to this, when the high-temperature pump 22 is actuated, the coolant circulates between the cooler core 31 and the condenser 12. Consequently, the low-temperature coolant flowing through the cooler core 31 flows into the condenser 12, and the coolant is exchanged between the cooler core 31 and the condenser 12.

As described above, while the pipe configuration is different from the above-described first embodiment, the first circulation condition and the second circulation condition are switched similarly to the first embodiment. Further, since the circulation condition is controlled to be in the second circulation condition after the stop of the compressor 15 to exchange the coolant, the temperature of the refrigerant in the chiller 13 can be increased. Accordingly, since the amount of the liquid refrigerant in the chiller 13 can be decreased as in the above-described first embodiment, and the refrigerant in the condenser 12 is condensed, the condenser 12 can start quickly.

Other Embodiments

Although the embodiments of the present disclosure have been described, the present disclosure is not limited to the above-described embodiments and can be modified within the scope of the present disclosure.

The configurations of the above-described embodiments are just examples, and the present disclosure is not limited to those.

In the above-described first embodiment, the high-temperature pump 22 is actuated and the low-temperature pump 32 is stopped, in step S3 shown in FIG. 2. However, step S3 is not limited to this control. Other controls are acceptable as long as the coolant is exchanged between the high-temperature cycle 20 and the low-temperature cycle 30. Accordingly, both the high-temperature pump 22 and the low-temperature pump 32 may be actuated such that the coolant in the high-temperature cycle 20 flows into the low-temperature cycle 30 due to the difference in capacity of the pumps. The high-temperature pump 22 may be stopped and the low-temperature pump 32 may be actuated such that the coolant in the high-temperature cycle 20 flows into the low-temperature cycle 30.

In the above-described first embodiment, the first valve 61 is provided only in the first pipe 41 as the connection portion, but the number of the valve is not limited to one. The valve may be additionally provided in the second pipe 42. The valve may be provided in each of the first branch portion 51, the second branch portion 52, the third branch portion 53, and the fourth branch portion 54. The amount of the coolant exchanged between the high-temperature cycle 20 and the low-temperature cycle 30 can be controlled by regulating the flow rate of the coolant flowing through the valves.

In the above-described first embodiment, the control is performed such that the coolant is exchanged between the high-temperature cycle 20 and the low-temperature cycle 30 after the stop of the compressor 15. However, the exchange of the coolant is not limited to after the stop of the compressor 15. For example, the control may be performed such that the coolant is exchanged between the high-temperature cycle 20 and the low-temperature cycle 30 after the stop of the compressor 15 is instructed and before the compressor 15 is stopped. That is, the coolant may be exchanged even before the stop of the compressor 15.

In the above-described first embodiment, the vehicular temperature regulation device 10 is used for cooling and heating the vehicle compartment. However, the usage of the vehicular temperature regulation device 10 is not limited to air conditioning. For example, the heating target or the cooling target may be an accessary device such as a rechargeable battery for a vehicle, and the vehicular temperature regulation device 10 may be used for heating and cooling the accessary device. Further, both the vehicle compartment and multiple accessary devices such as a rechargeable battery may be used as the heating target and the cooling target of the vehicular temperature regulation device 10.

Although the present disclosure has been fully described in connection with the embodiments thereof, it is to be noted that various changes and modifications will become apparent to those skilled in the art. Moreover, other combinations and configurations, including more, less or only a single element, are also within the spirit and scope of the present disclosure.

The invention claimed is:

1. A vehicular temperature regulation device comprising:
a refrigeration cycle in which a refrigerant circulates;
a high-temperature cycle in which a heat medium circulates; and
a low-temperature cycle in which the heat medium circulates, wherein
the refrigeration cycle includes
a compressor configured to draw and discharge the refrigerant,
a heating heat exchanger configured to heat the heat medium in the high-temperature cycle by exchanging heat between the refrigerant discharged from the compressor and the heat medium circulating in the high-temperature cycle,
a decompressor configured to decompress and expand the refrigerant which has exchanged heat in the heating heat exchanger, and
a cooling heat exchanger configured to cool the heat medium in the low-temperature cycle by exchanging heat between the refrigerant decompressed and expanded by the decompressor and the heat medium circulating in the low-temperature cycle,
the high-temperature cycle includes
a first pump configured to circulate the heat medium, and
a heating portion configured to heat a heating target by using the heat medium heated in the heating heat exchanger,
the low-temperature cycle includes
a second pump configured to circulate the heat medium, and
a cooling portion configured to cool a cooling target by using the heat medium cooled in the cooling heat exchanger,
the vehicular temperature regulation device further comprises:
a connection portion that connects the high-temperature cycle and the low-temperature cycle;
a regulation portion that is provided in the connection portion and is configured to regulate a flow of the heat medium between the high-temperature cycle and the low-temperature cycle; and
a controller configured to control the regulation portion, the first pump, and the second pump, wherein
in response to a turning off of an ignition switch, or in response to an operation to stop an air conditioning, the controller controls the regulation portion, the first pump, and the second pump to exchange at least a part of the heat medium between the high-temperature cycle and the low-temperature cycle.

2. The vehicular temperature regulation device according to claim 1, wherein
the controller is configured to control the regulation portion, the first pump, and the second pump such that the exchange of the heat medium continues until a predetermined exchange end condition is met.

3. The vehicular temperature regulation device according to claim 2, further comprising:
a first detector configured to detect temperature of the heat medium in the high-temperature cycle, and
a second detector configured to detect temperature of the heat medium in the low-temperature cycle, wherein
the exchange end condition is met when a difference between the temperature of the heat medium in the high-temperature cycle detected by the first detector and the temperature of the heat medium in the low-temperature cycle detected by the second detector is within a predetermined range.

4. The vehicular temperature regulation device according to claim 1, further comprising:

a second regulation portion provided in the high-temperature cycle and configured to regulate the flow of the heat medium to the heating portion; and a third regulation portion provided in the low-temperature cycle and configured to regulate the flow of the heat medium to the cooling portion, wherein the regulation portion, the second regulation portion, and the third regulation portion are configured to cooperatively switch the flow of the heat medium in the high-temperature cycle and the low-temperature cycle between a first circulation condition in which the heat medium circulating in the high-temperature cycle is separated from the heat medium circulating in the low-temperature cycle, and a second circulation condition in which the heat medium circulates between the heating heat exchanger and the cooling heat exchanger without passing through the cooling portion and the heating portion, and in response to the turning off of the ignition switch, or in response to the operation to stop the air conditioning, the controller controls the regulation portion, the second regulation portion, and the third regulation portion to switch from the first circulation condition to the second circulation condition.

* * * * *